(12) United States Patent
Bouillon et al.

(10) Patent No.: US 10,364,702 B2
(45) Date of Patent: Jul. 30, 2019

(54) DE-ICING NOSE FOR LOW-PRESSURE COMPRESSOR OF AN AXIAL TURBINE ENGINE

(71) Applicant: Safran Aero Boosters SA, Herstal (Milmort) (BE)

(72) Inventors: David Bouillon, Woluwe-Saint-Lambert (BE); Ghislain Herbaut, Berloz (BE)

(73) Assignee: Safran Aeroboosters SA (BE)

( * ) Notice: Subject to any disclaimer, the term of this patent is extended or adjusted under 35 U.S.C. 154(b) by 308 days.

(21) Appl. No.: 15/276,859

(22) Filed: Sep. 27, 2016

(65) Prior Publication Data

US 2017/0101888 A1 Apr. 13, 2017

(30) Foreign Application Priority Data

Oct. 7, 2015 (BE) .................................... 2015/5640

(51) Int. Cl.
*F01D 25/02* (2006.01)
*F02C 7/047* (2006.01)

(52) U.S. Cl.
CPC .............. *F01D 25/02* (2013.01); *F02C 7/047* (2013.01); *F05D 2220/323* (2013.01); *F05D 2240/14* (2013.01); *F05D 2250/75* (2013.01); *F05D 2260/20* (2013.01); *Y02T 50/672* (2013.01)

(58) Field of Classification Search
CPC ................................ F02C 7/047; F01D 25/02
See application file for complete search history.

(56) References Cited

U.S. PATENT DOCUMENTS

| 5,925,275 | A | 7/1999 | Lawson et al. |
| 6,725,645 | B1 * | 4/2004 | Wadia ..................... F01D 25/02 |
| | | | 29/890.1 |
| 8,015,788 | B2 * | 9/2011 | Stephenson ............. F01D 5/046 |
| | | | 415/114 |
| 8,366,047 | B2 * | 2/2013 | Euvino, Jr. ............. F01D 25/02 |
| | | | 244/134 D |
| 2004/0065092 | A1 | 4/2004 | Wadia et al. |
| 2014/0014640 | A1 | 1/2014 | Calder et al. |

FOREIGN PATENT DOCUMENTS

EP 1405986 A2 4/2004

OTHER PUBLICATIONS

European Search Report from corresponding Belgium Application No. BE 201505640, dated Jun. 22, 2016.

* cited by examiner

*Primary Examiner* — Igor Kershteyn
*Assistant Examiner* — John S Hunter, Jr.
(74) *Attorney, Agent, or Firm* — Sandberg Phoenix & von Gontard P.C.

(57) ABSTRACT

The invention proposes a de-icing splitter nose at the inlet of the low-pressure compressor of a double-flow turbine engine. The splitter nose comprises an annular separation surface with a circular leading edge, the surface being adapted to separate an upstream flow into a primary flow and a secondary flow. The nose further comprises an electric de-icing device with a heating element having a series of parallel, electric, heating strips. The strips are inserted between two strata of dielectric material and are able to prevent the formation of ice on the annular surface, as close as possible to the leading edge.

15 Claims, 3 Drawing Sheets

DE-ICING NOSE FOR LOW-PRESSURE COMPRESSOR OF AN AXIAL TURBINE ENGINE

CROSS-REFERENCE TO RELATED APPLICATIONS

This application claims the benefit, under 35 U.S.C. § 119, of BE 2015/5640 filed Oct. 7, 2015, the disclosure of which is incorporated herein by reference in its entirety.

FIELD

The invention relates to the sector of splitter noses at the inlet of a turbine engine compressor. More particularly, the invention relates to a de-icing nose at the inlet of a turbine engine compressor. The invention also relates to a compressor and to an axial turbine engine, in particular, an airplane turbojet engine or an aircraft turboprop engine.

BACKGROUND

The inlet of a low-pressure compressor of a turbojet engine is generally delimited by a circular splitter nose. Positioned inside and downstream of the separation lip of the nacelle, the splitter nose divides a flow entering the turbine engine into a primary flow and a secondary flow. The division of these guided flows depends on the diameter and the form of the leading edge.

During operation, the splitter nose is subject to icing. A sheet of ice forms and accumulates there, modifying the form of the leading edge. As a result, the flow towards the primary duct is disturbed. Moreover, the ice may develop forming actual blocks of ice at various points. Owing to the intense vibrations affecting the turbojet engine, these blocks of ice eventually come loose and are inevitably sucked into the compressor. There they damage the vanes or blades, thus causing deterioration in the performance of the turbine engine with the risk of breakdown.

In order to safeguard against these effects, the splitter nose is currently fitted with a heating device. This device heats up the nose so as to prevent the formation of ice or melt the ice which has already formed. The heat may be provided by the oil of the turbine engine or it may be electrically produced.

The document US 2004/0065092 A1 discloses a low-pressure turbine engine compressor. The compressor has a splitter nose, the outer surface of which is lined with a de-icing device. The device has a polymer layer in which a coil of heating wire is embedded. When the latter is electrically energized, it heats up in the manner of an electrical resistance. This prevents the formation of ice on the leading edge. However, this technology is bulky and it is unable to ensure a thin form of the leading edge required for precise distribution of the flows. Moreover, the position of the turns in the thickness of the polymer layer is random. During operation, certain zones of the external surface are not sufficiently heated, while other zones are overheated.

SUMMARY

The invention aims to solve at least one of the problems posed by the prior art. More precisely, the invention aims to improve the compactness of a de-icing splitter nose of a turbine engine compressor. The invention also aims to propose a simple, resistant, lightweight, low-cost, reliable and easy-to-produce solution while improving the performance.

In various embodiments, the invention provides a splitter nose for a compressor of an axial turbine engine, wherein the splitter nose comprises an annular separation surface with a circular leading edge, the surface being adapted to separate an upstream flow into two annular flows, in particular into a primary flow and a secondary flow. The splitter nose additionally comprises an electric de-icing device with a heating element, notable in that the heating element comprises at least one electric heating strip which is adapted to prevent the formation of ice on the annular surface.

According to various advantageous embodiments of the invention, the or each strip radially crosses the circular leading edge.

According to various advantageous embodiments of the invention, the splitter nose comprises a heated annular zone in which the or each strip is inset, the strip or strips occupying at least 10%, for example at least 25%, in various instances most of the heated zone.

According to various advantageous embodiments of the invention, the strip or each strip performs U-turns, for example at least five U-turns, in various instances at least ten U-turns.

According to various advantageous embodiments of the invention, the element comprises several strips and two connectors each connected to the strips, i.e. an internal connector arranged radially on the inside of the leading edge and an external connector arranged radially on the outside of the leading edge.

According to various advantageous embodiments of the invention, the de-icing device and/or the heating element comprise(s) several strips which are parallel and/or extend alongside each other.

According to various advantageous embodiments of the invention, the splitter nose comprises an annular hook, in particular for fixing an external shroud, the heating element, in various instances the or each strip, axially straddling the annular hook.

According to various advantageous embodiments of the invention, the splitter nose comprises a layer of dielectric material with two strata of dielectric material, the or each strip being arranged at the interface between the strata.

According to various advantageous embodiments of the invention, the strata comprise a downstream stratum and an upstream stratum, thermal conductivity of which is greater than that of the downstream stratum, the or each strip being inset in the thickness of the upstream stratum.

According to various advantageous embodiments of the invention, the or all the strips radially intersect(s) most of the circumference of the leading edge.

According to various advantageous embodiments of the invention, the splitter nose comprises an annular cavity and an annular partition separating the annular cavity from the annular flows, in various instances the heating element, in particular the or each strip, being at the interface between the cavity and the annular partition.

According to various advantageous embodiments of the invention, the splitter nose comprises an annular partition with a variable-thickness portion forming an annular body, the body having in various instances a maximum thickness in the region of the leading edge and receiving, where applicable, the annular hook.

According to various advantageous embodiments of the invention, the annular body comprises an external annular step axially delimiting the heating element and, where applicable, the dielectric layer.

According to various advantageous embodiments of the invention, the splitter nose comprises an organically based composite material, forming in particular the partition.

According to various advantageous embodiments of the invention, the heating element comprises several electric heating strips adapted to prevent the formation of ice on the annular surface.

According to various advantageous embodiments of the invention, the or each heating element is a monobloc element, its strips being in various instances formed as one piece.

According to various advantageous embodiments of the invention, the or each strip forms on the heating element a zone of lesser thickness and/or a zone of lesser width, and/or a zone of smaller cross-section, in particular for increasing the electrical resistance per unit length.

According to various advantageous embodiments of the invention, the spacing between two adjacent portions of strip is less than or equal to 1.00 mm, for example less than or equal to 0.5 mm.

According to various advantageous embodiments of the invention, the heated annular zone is delimited radially and/or axially by the or each strip, the zone being optionally at least 10% or 25% free of strip.

According to various advantageous embodiments of the invention, the device comprises several heating elements, in various instances connected in parallel.

According to various advantageous embodiments of the invention, the annular body is generally solid, the body being covered by the or each strip and/or by the dielectric layer; optionally over its entire radial height.

According to various advantageous embodiments of the invention, the or each strip has two opposite sides, each stratum covering one of the two opposite sides.

According to various advantageous embodiments of the invention, the or each strip comprises main arms which are parallel to the axis of symmetry of the splitter nose.

According to various advantageous embodiments of the invention, the or each strip is thinner than it is wide, in various instances at least five-fold or ten-fold or twenty-fold.

According to various advantageous embodiments of the invention, the or each strip is thinner than each stratum, in various instances at least two-fold or ten-fold.

According to various advantageous embodiments, each connector is wider than each strip, in various instances at least three-fold, and optionally is thicker.

The invention also relates to a compressor of an axial turbine engine, in particular of the low-pressure type, comprising a splitter nose, wherein the splitter nose is in accordance with the invention.

According to various advantageous embodiments of the invention, the compressor comprises an external shroud and an annular series of stator vanes extending radially from the external shroud, the shroud being fixed to the splitter nose, in particular via its annular hook.

The invention also relates to a turbine engine, comprising a splitter nose, wherein the splitter nose is in accordance with the description herein, and the turbine engine comprises a compressor with a separation nozzle, whereby the compressor can be in accordance with the description herein.

According to various advantageous embodiments of the invention, the turbine engine comprises an electric source designed to produce electric current and electrically powering the or each strip. According to various advantageous embodiments of the invention, the electric heating strip strengthens the annular separation surface of the axial turbine engine compressor circular leading edge.

Generally, the advantageous embodiments of each subject of the invention are also applicable to the other subjects of the invention. In so far as possible, each subject of the invention can be combined with the other subjects.

The invention employs strips for covering the splitter nose without increasing significantly either its thickness or its radius of curvature in the region of the leading edge. Such a form allows the lightness of the nose to be maintained and is pliable when applied onto the leading edge of the compressor despite the small upstream radius. The thin form of the strips is such that the de-icing temperature can be reduced, this simplifying the manufacture of an organically based composite splitter nose.

The dielectric layer comprises at least two strata. With this arrangement it is possible to provide a support layer, i.e. a layer making contact with the body, so as to manage better the spacing between the strips and the body as well as the distance between these same strips and the separation surface. Thus, the de-icing effect is more homogeneous and therefore better controlled, despite the size and thin form of a compressor splitter nose.

DRAWINGS

DETAILED DESCRIPTION

In the description which follows, the terms "internal" and "external" refer to a position in relation to the axis of rotation of a turbine engine. The axial direction corresponds to the direction along the axis of rotation of the turbine engine. The radial direction is perpendicular to the axis of rotation. "Upstream" and "downstream" refer to the main flow direction of the flow inside the turbine engine. It is understood in the present invention that the de-icing feature is suitable both for preventing the accumulation of ice and for melting ice which has already accumulated.

Figure 1:
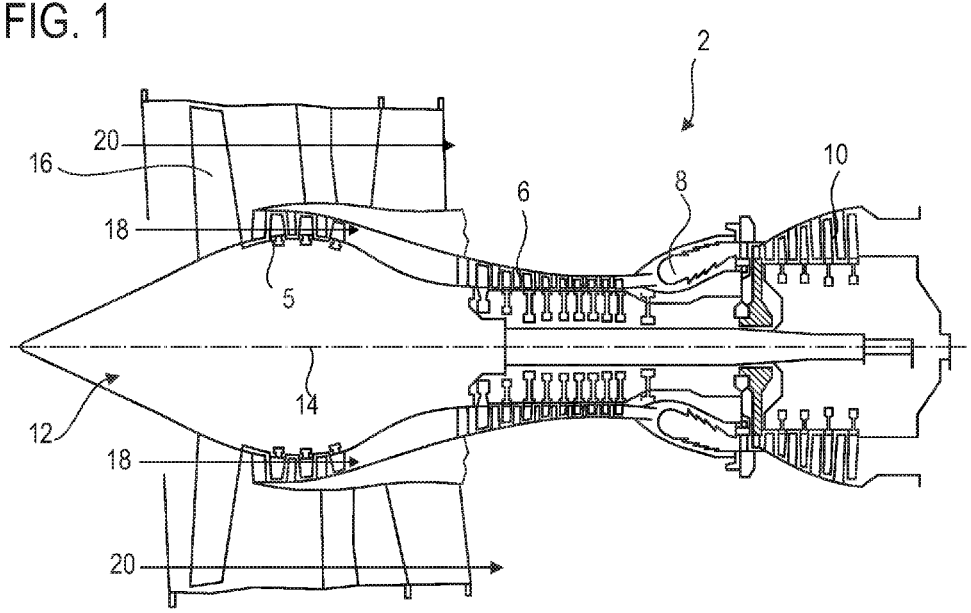
FIG. 1 shows an axial turbine engine according to various embodiments of the invention.

FIG. 1 shows in a simplified manner an axial turbine engine. It consists in this particular case of a double-flow turbojet engine. The turbojet engine 2 comprises a first compression stage, called "low-pressure compressor" 5, a second compression stage, called "high-pressure compressor" 6, a combustion chamber 8 and one or more turbine stages 10. During operation, the mechanical power of the turbine 10 transmitted via the central shaft to the rotor 12 causes the movement of the two compressors 5 and 6. The latter comprise several series of rotor blades associated with series of stator vanes. Through rotation of the rotor 12 about its axis of rotation 14 it is thus possible to generate an air flow and gradually compress the latter as far as the inlet of the combustion chamber 8.

An inlet ventilator commonly called "fan" or "blower" 16 is connected to the rotor 12 and generates an air flow which is divided into a primary flow 18, passing through the different aforementioned stages of the turbine engine, and a secondary flow 20, passing through an annular duct (partially shown) along the engine and being combined again with the primary flow 18 output from the turbine. The secondary flow 20 can be accelerated so as to generate a thrust reaction. The primary flow 18 and secondary flow 20 are radially concentric annular flows. They are channelled by the housing of the turbine engine and/or by shrouds.

Figure 2:
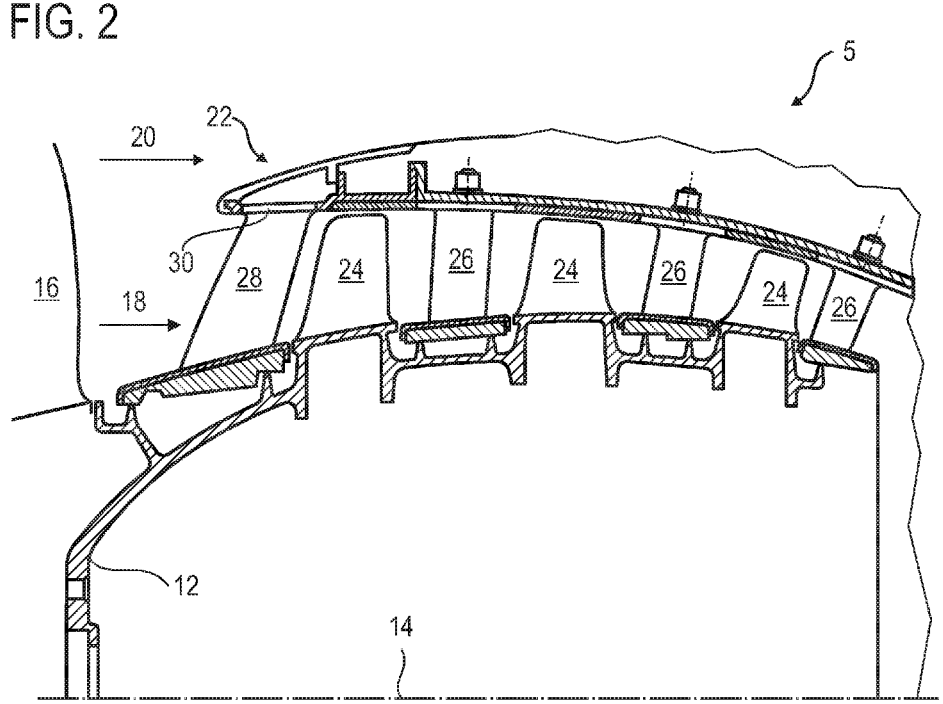
FIG. 2 is a diagram of a turbine engine compressor according to various embodiments of the invention.

FIG. 2 is a sectioned view of a compressor of an axial turbine engine such as that shown in FIG. 1. The compressor can be the low-pressure compressor 5. A part of the fan 16 and the splitter nose 22 for the primary flow 18 and the secondary flow 20 can be seen in the FIG. 2. The rotor 12 comprises several series of rotor blades 24, in this case three series.

The low-pressure compressor 5 comprises three diffusers, in this case four diffusers, which each contain an annular series of stator vanes (26; 28). The diffusers are associated with the fan 16 or with a series of rotor blades 24 for distributing the air flow so as to convert the speed of the flow into static pressure. The stator vanes 28 associated with the fan 16 form the inlet series of the compressor and are commonly referred to as Inlet Guide Vanes (IGV). These vanes 28 are supported by an external shroud 30 from which they extend radially inwards.

Figure 3:
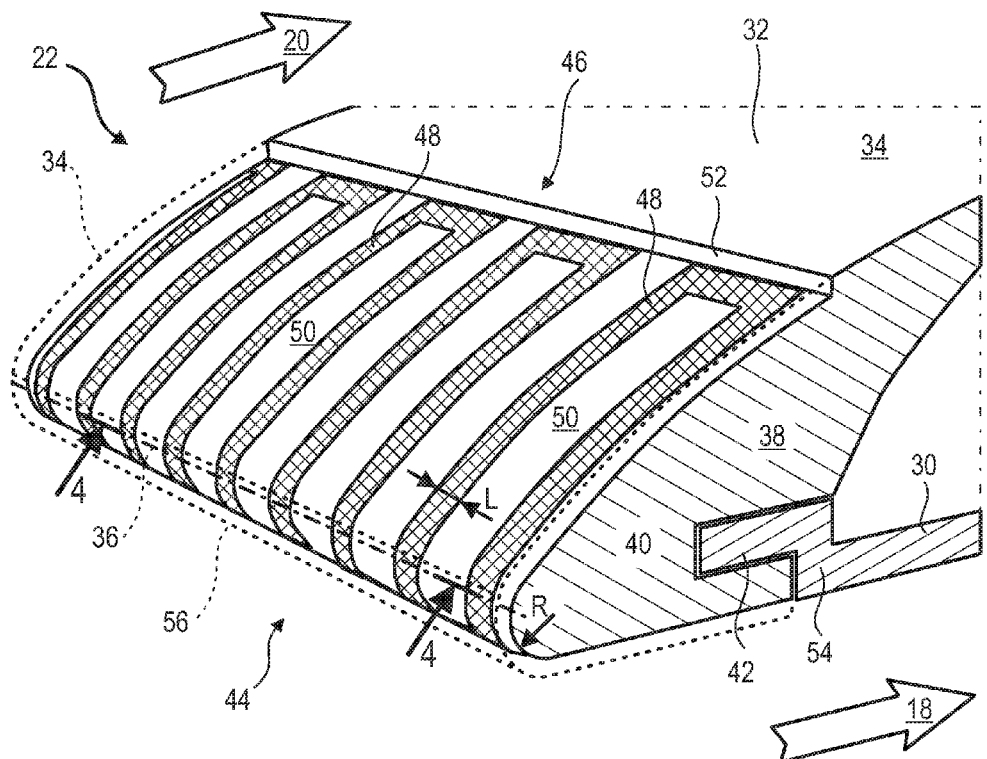
FIG. 3 shows a splitter nose according to various embodiments of the invention.

FIG. 3 shows a diagrammatic section of an upstream portion of the splitter nose 22. In FIG. 3 the external shroud 30 which is fixed to the splitter nose 22 can be seen.

The splitter nose 22 has an annular wall 32 forming an annular separation surface 34 with a circular leading edge 36 at the upstream end. This surface 34 is able to divide an incoming flow entering the turbine engine into a primary flow 18 and a secondary flow 20 from the leading edge 36. In the region of the leading edge 36, the profile of revolution of the splitter nose 22 has a radius of curvature R which is smaller than or equal to 10 mm, in various instances smaller than or equal to 5.00 mm. The splitter nose 22 can have an annular body 38 forming a circular block of material. It can form an additional thickness on the annular wall 32. The wall 32, and in particular the body 38 can be made of an organically based composite material in order to lighten the splitter nose 22. The composite material can comprise a fibrous reinforcement in the form of a preform or in the form of fibres distributed within the volume of the composite material. "Composite material" is understood as meaning a material formed by several basic components, the combination of which provides the whole with properties which none of the components considered separately possess.

The shroud 30 can be connected to the splitter nose 22 by means of a circular fixing element such as an annular hook 40. The splitter nose 22 has for this purpose an annular recess open in the downstream direction, while the external shroud 30 has a tubular contact part 42 engaged inside the recess. The annular hook 40 can be formed in the annular body 38.

In order to overcome the problem of ice, whether it be preventing its formation or melting it, the splitter nose 22 is provided with a de-icing heating device 44. The latter is energized with electric power supplied by the turbine engine, via a battery and/or a generator (neither shown). The device 44 comprises at least one electric heating element 46, in various instances several electric heating elements 46, which are distributed all the way around the splitter nose 22 and can also be arranged along the leading edge 36. This arrangement helps prevent the formation of ice in this location and prevents the ice deposited from spreading towards the downstream vanes and blades.

Each electric heating element 46 comprises at least one electric heating strip 48, in various instances several electric heating strips 48. The strips 48 are electric conductors, for example made of metal such as copper or aluminium. They can be made of nichrome, an alloy comprising nickel and chromium. Alternatively, they can be made of graphite or carbon. The strips 48 form electrical heating resistances which dissipate the electric power by means of the Joule effect. The electrical resistance of the material forming the strips 48 is less than or equal to $50*10^{-5}\Omega*m$, in various instances less then or equal to $80*10^{-9}\Omega*m$.

The strips 48 comprise arms which are generally parallel and cross the leading edge 36. The arms can be axial arms. The strips 48 form crenations or serpentines straddling the leading edge 36 so as to heat the separation surface 34 on the inside and on the outside from the leading edge 36. The strips 48 perform several U-turns, both along the circumference and axially. The strips 48 occupy a heated annular zone 50 where the de-icing device 44 counteracts the presence of frost or ice, preventing it from forming or causing it to melt. The heated zone 50 has a curved profile and extends from the leading edge 36 inwards and outwards. Each of its edges is delimited by the tops of the strips 48. The heated zone 50 can be delimited by a circular step 52 on the outside and by an annular angle-piece 54 of the external shroud 30 or an inner surface of the external shroud 30 in contact with the primary flow 18. The strips 48 occupy between 10% and 90%, for example between 30% and 45%, of the zone 50, allowing the coverage to be optimized.

The heating element 46 is incorporated in a layer of dielectric material 56 (indicated by means of broken lines) which electrically insulates the heating element 46 from the body 38 of the splitter nose 22. The heating element 46 is embedded in the layer 56, this allowing each side of the strips 48 to be covered. The latter are therefore electrically insulated from the body 38 and protected from the erosion caused by the flows. The dielectric layer 56 forms the separation surface 34 along the leading edge 36, and it extends inwards towards the external shroud 30 and outwards into the secondary flow 20, optionally towards acoustic panels or heat exchangers (not shown). Of course, the wall itself can be made of a dielectric material, resulting in the dielectric layer being optional.

The strips 48 are essentially thin, for example with a thickness less than or equal to 0.5 mm, for example less than or equal to 0.1 mm. Their width L is less than or equal to 10 mm, for example less than or equal to 4 mm. Their width is substantially equal to the radius of curvature R of the profile of revolution of the splitter nose on the leading edge. The ratio R/L is within the range [0.5-2], for example within the range [0.8-1.30], the terminals included. The width of the strips 48 is less than or equal to the circumferential spacing between the strips 48.

Figure 4:
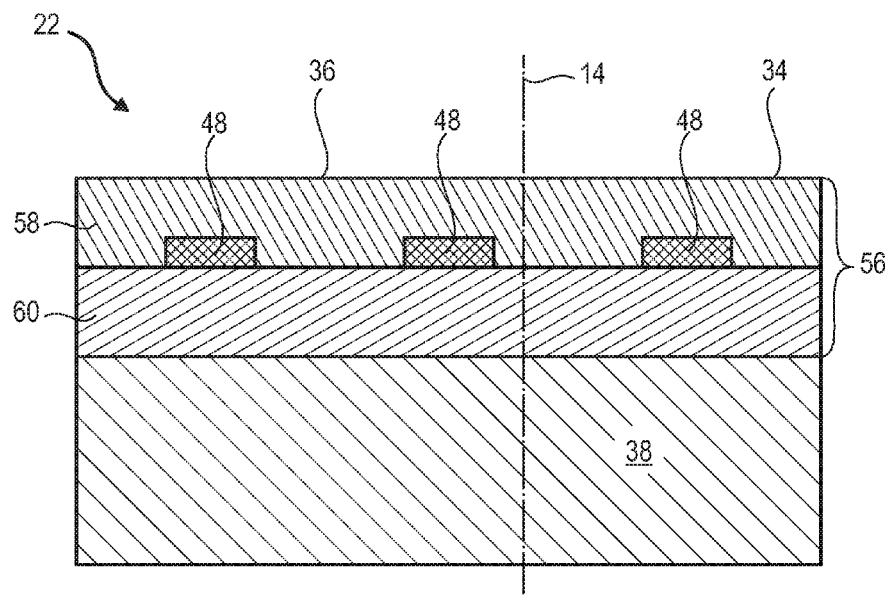
FIG. 4 shows a de-icing device sectioned along the axis 4-4 indicated in FIG. 3 in accordance with various embodiments of the invention.

FIG. 4 shows a portion of the splitter nose 22 according to various embodiments of the invention. The portion corresponds to a section along the axis 4-4 indicated in FIG. 3, whereby this axis can correspond to the leading edge 36. The axis of rotation 14 is shown by way of a reference point.

The dielectric layer 56 is arranged upstream of the body 38 in the same way as the strips 48, this allowing heating as close as possible to the leading edge 36. The dielectric layer 56 can comprise at least two—optionally more than two—dielectric strata (58; 60). These strata (58; 60) are superimposed and form a laminate lining the upstream side of the body 38. The strips 48 are arranged at the interface of the strata (58; 60). The upstream stratum 58 covers the strips 48, the latter being inset in the thickness of the stratum 58. These strips 48 are generally smooth. They mate with the surface of the body 38. The profiles of the strips 48 generally have constant thicknesses and widths.

The layer 56 can comprise polyvinyl chloride (PVC), polypropylene, Teflon, Bakelite, epoxy and/or Kapton which is a polyimide film. For example the upstream stratum 58 can comprise Bakelite and/or polypropylene. Its thermal conductivity can be greater than or equal to 0.40 W/(m*K), in various instances greater than or equal to 1.00 W/(m*K). The downstream stratum 60 can comprise epoxy and/or polyvinyl chloride (PVC) and/or Kapton. Its thermal conductivity can be less than or equal to 0.25 W/(m*K), in various instances less than or equal to 0.17 W/(m*K), for example less than or equal to 0.12 W/(m*K). Thermal conductivity of the upstream stratum 58 is greater than thermal conductivity of the downstream stratum 60, in various instances at least 50% greater, for example at least twice greater. The upstream stratum 58 can be covered with an outer film (not shown) protecting it against erosion.

Figure 5:
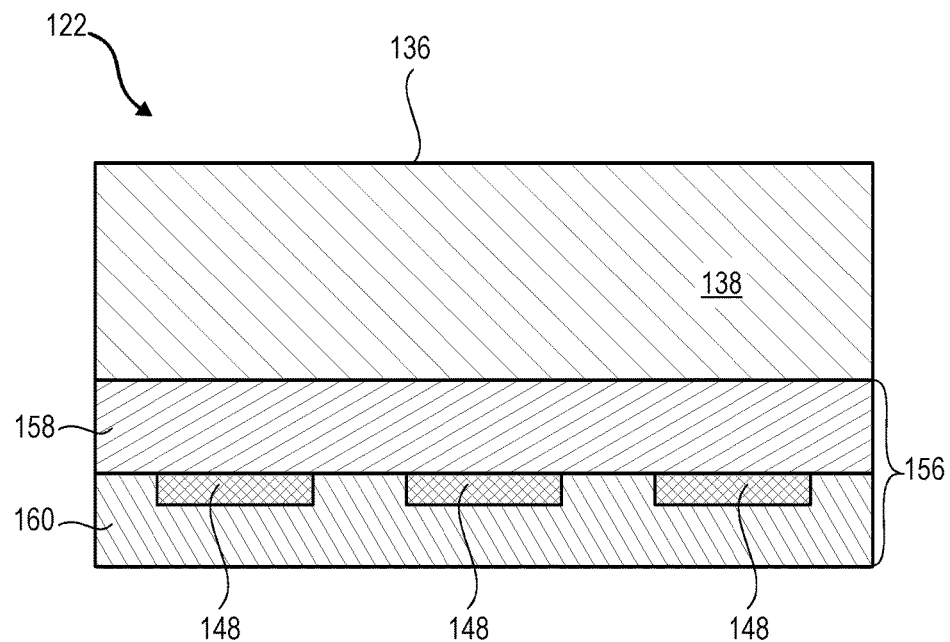
FIG. 5 shows a de-icing device sectioned in accordance with various other embodiments of the invention.

FIG. 5 shows a portion of a splitter nose 122 according to various other embodiments of the invention. The FIG. 5 reproduces the numbering of the preceding figures for identical or similar parts, the numbering being however increased by 100. The portion can correspond to a section along the axis 4-4 indicated in FIG. 3, whereby this axis can correspond to the leading edge.

The materials used for the layer 156 and its strata (158; 160) and the strips 148 can be identical to those mentioned above. Similarly, the forms can be identical to those described above. Here the dielectric layer 156 and the strips 148 are arranged downstream of the body 138, i.e. on the opposite to the leading edge 136. In this location they are mechanically protected against erosion.

The strips 148 heat up the leading edge 136 by means of thermal conduction through the upstream stratum 158 and through the body 138. Thermal conduction of the upstream stratum 158 will be greater than that of the downstream stratum 160 so as to favour heat dissipation, and therefore heating upstream.

Figure 6:
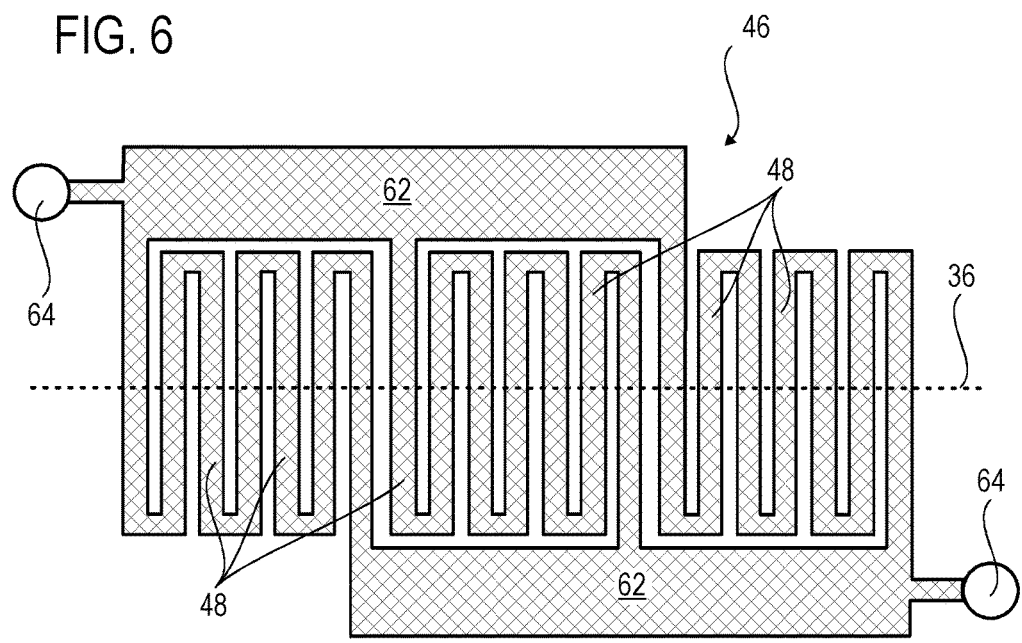
FIG. 6 shows a heating element according to various embodiments of the invention.

FIG. 6 shows a heating element 46 in the flat condition. The imaginary position of the leading edge 36 is indicated by means of a broken line. This heating element 46 can be employed both in the first embodiment and in the second embodiment of the invention. The axis of rotation 14 is indicated by way of example.

The heating element 46 has several sets of strips 48, in the case in question three sets, but any other number is also possible. It forms an electric circuit with heating tracks realized by the strips 48. The strips 48 are connected in parallel. In pairs, their axial arms form crenations at their joining point. Each strip 48 forms six crenations, three upstream and three downstream. The strips 48 form flat serpentines, or a sinusoid, allowing a greater area to be covered.

The heating element 46 comprises two connectors 62 in the form of strips. The connectors are electrically connected to each strip 48 which they border. The electric resistance per unit length of each connector 62 can be less than that of the strips 48 so as to concentrate heating by means of the Joule effect in the region of the strips 48. The heating element 46 comprises moreover electric terminals 64, each associated with one of the connectors. When the splitter nose has several heating elements 46, they can be connected in parallel via their electric terminals 64. Each heating element 46 can be a dipole. In the assembled configuration, each connector 62 is located alongside a leading edge 36.

It is possible to provide a heating element running all the way around the nose. In order to maintain efficiency despite accidental cutting of a strip, each strip can be divided into two. For example, two associated strips can form crenations being fitted together. The invention can comprise the splitter noses according to the embodiments of the invention, in particular by placing one element with heating strips on the outside of the wall and another element with heating strips on the inside of the wall, i.e. inside the cavity. Each element is associated with two dielectric strata.

What is claimed is:

1. An axial turbine engine splitter nose, said nose comprising:
    an annular separation surface with a circular leading edge, the annular separation surface being structured and operable to separate an upstream flow into two annular flows, the annular separation surface being axisymmetric around an axis; and
    an electrical de-icing device with an electrical heating element; the electrical heating element comprises at least one electric heating strip which is structured and operable to prevent the formation of ice on the annular separation surface, the nose further comprising:
    an annular partition with a variable-thickness portion forming an annular body, the annular body having a maximum thickness in a region of the circular leading edge; and
    a layer of dielectric material,
    wherein the annular body comprises an external annular step protruding radially outwardly so as to form a contact surface perpendicular to the axis, the annular body extending upstream and downstream of the external annular step, and
    wherein the contact surface extends radially from an inner circular edge to an outer circular edge, and the layer of dielectric material axially abuts the contact surface between the inner circular edge and the outer circular edge.

2. The axial turbine engine splitter nose according to claim 1, wherein each of the at least one electric heating strip crosses radially the circular leading edge.

3. The axial turbine engine splitter nose according to claim 1, further comprising a heated annular zone in which each of the at least one electric heating strip is inset, the at least one electric heating strip occupying at least 10% of the heated annular zone.

4. The axial turbine engine splitter nose according to claim 1, wherein each of the at least one electric heating strip comprises U-turns.

5. The axial turbine engine splitter nose according to claim 1, wherein the at least one electric heating strip comprises two electric heating strips and the axial turbine engine splitter nose further comprises two connectors each connected to a respective one of the two electric heating strips, wherein one of the two connectors is an internal connector arranged radially inwardly of the circular leading edge and the other of the two connectors is an external connector arranged radially outwardly of the circular leading edge.

6. The axial turbine engine splitter nose according to claim 1, wherein the at least one electric heating strip comprises at least two electric heating strips that are parallel to each other.

7. The axial turbine engine splitter nose according to claim 1, further comprising an annular hook for fixing an external shroud, each of the at least one electric heating strip axially straddling the annular hook.

8. The axial turbine engine splitter nose according to claim 1, wherein the layer of dielectric material comprises two strata of dielectric material, each of the at least one electric heating strip being arranged at an interface between the two strata of dielectric material.

9. The axial turbine engine splitter nose according to claim 8, wherein the two strata of dielectric material comprise a downstream stratum having a thermal conductivity and an upstream stratum having a thermal conductivity that is greater than the thermal conductivity of the downstream stratum, each of the at least one electric heating strip being inset in a thickness of the upstream stratum.

10. The axial turbine engine splitter nose according to claim 1, wherein all strips of the at least one electric heating strip radially intersect the circular leading edge.

11. The axial turbine engine splitter nose according to claim 1, further comprising an annular cavity and an annular partition separating the annular cavity from each of the two annular flows.

12. The axial turbine engine splitter nose according to claim 11, wherein the electrical heating element is arranged at an interface between the annular cavity and the annular partition.

13. The axial turbine engine splitter nose according to claim 11, further comprising an organically based composite material forming the annular partition.

14. The axial turbine engine splitter nose according to claim 1, wherein the at least one electric heating strip strengthens the annular separation surface circular, the axial turbine engine splitter nose further comprising:
  an external shroud and an annular series of stator vanes extending radially from the external shroud, the external shroud being fixed to the axial turbine engine splitter nose via an annular hook.

15. The axial turbine engine splitter nose according to claim 14, wherein the external shroud comprises a tubular contact part inserted into the annular hook, and wherein the electric heating element axially overlaps the tubular contact part and the annular hook.

* * * * *